(12) United States Patent
Dicioccio

(10) Patent No.: US 7,188,387 B2
(45) Date of Patent: Mar. 13, 2007

(54) VEHICLE DETAILING ATTACHMENT

(76) Inventor: Joseph Dicioccio, 1001 S. Route 130, Burlington, NJ (US) 08016

( * ) Notice: Subject to any disclaimer, the term of this patent is extended or adjusted under 35 U.S.C. 154(b) by 615 days.

(21) Appl. No.: 10/400,424

(22) Filed: Mar. 27, 2003

(65) Prior Publication Data

US 2003/0182755 A1 Oct. 2, 2003

Related U.S. Application Data

(60) Provisional application No. 60/368,574, filed on Mar. 27, 2002.

(51) Int. Cl.
A47L 11/30 (2006.01)
(52) U.S. Cl. .......................... 15/321; 15/414
(58) Field of Classification Search ............... 15/300.1, 15/302, 312.2, 313, 320–322, 414
See application file for complete search history.

(56) References Cited

U.S. PATENT DOCUMENTS

| | | | | |
|---|---|---|---|---|
| 2,885,713 A | * | 5/1959 | Morrill | 15/322 |
| 3,962,745 A | * | 6/1976 | Collier | 15/322 |
| 4,534,083 A | * | 8/1985 | Hampson | 15/321 |
| 4,864,680 A | * | 9/1989 | Blase et al. | 15/321 |
| 4,938,421 A | * | 7/1990 | Berfield et al. | 239/309 |
| 5,586,360 A | * | 12/1996 | Diederiks et al. | 15/410 |
| 5,655,255 A | * | 8/1997 | Kelly | 15/322 |
| 5,657,509 A | * | 8/1997 | Trautloff et al. | 15/321 |
| 5,898,970 A | * | 5/1999 | Straiton | 15/321 |
| 6,151,748 A | * | 11/2000 | Earhart et al. | 15/321 |
| 2004/0177469 A1 | * | 9/2004 | Sadaune et al. | 15/322 |

* cited by examiner

Primary Examiner—Terrence R. Till
(74) Attorney, Agent, or Firm—Donald C. Simpson, Esq.

(57) ABSTRACT

A vehicle cleaning apparatus adapted to be connected to a flexible hose of a wet vac, and having a separate connection for attaching a hose to a supply of water in which the working end of the attachment can be operated with one hand with great maneuverability inside a vehicle and, when needed, can supply a spray of water for individual spots requiring wetting as needed by the activation of a spring valve that is located a substantial distance away from the cleaning end of the attachment.

1 Claim, 8 Drawing Sheets

VEHICLE DETAILING ATTACHMENT

This patent application is based on Provisional Patent Application No. 60/368,574 filed Mar. 27, 2002, by the same inventor, the benefit of which is hereby claimed.

BACKGROUND OF THE INVENTION

This invention relates to an attachment which can be used in combination with relatively inexpensive and readily available equipment presently available to automobile detailers and others who are interested in cleaning the interior of used vehicles.

The used vehicle trade is a substantial business involving not only used automobiles, but used pick-up trucks and the like. The used vehicles are frequently obtained as a result of trade-ins towards the purchase of new vehicles, through private sales or through automobile auctions. Before the used vehicle is offered for sale, it is the practice to place the vehicle in clean condition, one part of which involves cleaning the interior of the vehicle, such as the upholstery and carpet of the vehicle. Special machines have been developed to aid in carrying out such cleaning processes, but are generally quite expensive and cumbersome, and are not generally readily maneuverable into the tighter places in the interior of a vehicle. Typically, such machines employ a hand tool which is moved back and forth over an area to be cleaned. The apparatus sprays a cleaning solution on the area to be cleaned, while at the same time vacuum extracting dirty solution and dirt. Lines coupled between the cleaning machine and the hand tool deliver cleaning solution by spray and suction extract the residue. Many different varieties of this basic concept are known in the prior art.

These prior art cleaning machines typically employ a separate pump for mixing water with concentrated chemical cleaner stored within the machine. The use of such pumps increases cost and complexity, while simultaneously reducing reliability. Moreover, typical prior art extraction cleaning machines normally include a storage area or device for temporarily storing recovered dirt-laden chemical solution.

As an alternative to these more complex and expensive devices, the trade frequently relies on the use of the readily available "wet vacs", i.e. tank-type vacuum devices that are capable of sucking up dirt and other debris, as well as liquids, or mixtures of the two, and storing them in the tank until the job is finished. The tank normally sits outside of the vehicle, and is connected by a flexible hose to a series of "wands" or other terminal end tools. Once again, however, it has been found that these devices are not readily adaptable to the various requirements of cleaning the tight spaces in the interior of a vehicle, and a great deal of energy and manipulation is required in order to provide a suitable cleaning of the vehicle. In typical use, the operator holds the "wand" in one hand and a hand-operated spray bottle in the other, and is continually forced to move one or the other in and out of the vehicle if it becomes necessary to wet down an area to effect a meaningful cleaning. It may also be necessary that the operator maintain a second spray bottle with a cleaning solution which the operator alternates with a water spray bottle while holding and operating the wet vac wand with the other hand. Obviously, in the tight spaces in the interior of a vehicle, particularly in the back seat area, manipulation of the equipment can be both awkward and slow in a business where time is money, and the quick cleaning of the vehicle is an important part of the turnover of a number of used vehicles.

SUMMARY OF THE INVENTION

The instant invention comprises an attachment for use with the prior art wet vacs which can be easily operated and manipulated in the interior of a vehicle and basically provide all of the advantages of the more expensive equipment described above, but without its limitation and expense. Wet vacs are readily available, and are already owned in many instances by persons and businesses concerned with the cleaning of the interior of vehicles, and all that is required of the user is the wet vac system and a typical pressurized source of water already available at most businesses and residences. The vehicle cleaning apparatus is adapted to be connected to the flexible hose of the wet vac, and has a separate connection for attaching a garden hose or the like to supply water to the device. The working end of the attachment can be operated with one hand with great maneuverability inside the vehicle and, when needed, can be supplied with a spray of water for individual spots requiring wetting as needed by the activation of a spring valve that is located a substantial distance away from the cleaning end of the attachment, thereby minimizing both the amount of equipment and the amount that the body of the user must be manipulated inside of the vehicle during the cleaning operation.

BRIEF DESCRIPTION OF THE DRAWINGS

In the following drawings, like-reference numerals have been employed throughout to indicate like-parts in the various views.

DETAILED DESCRIPTION OF THE INVENTION

Figure 1:
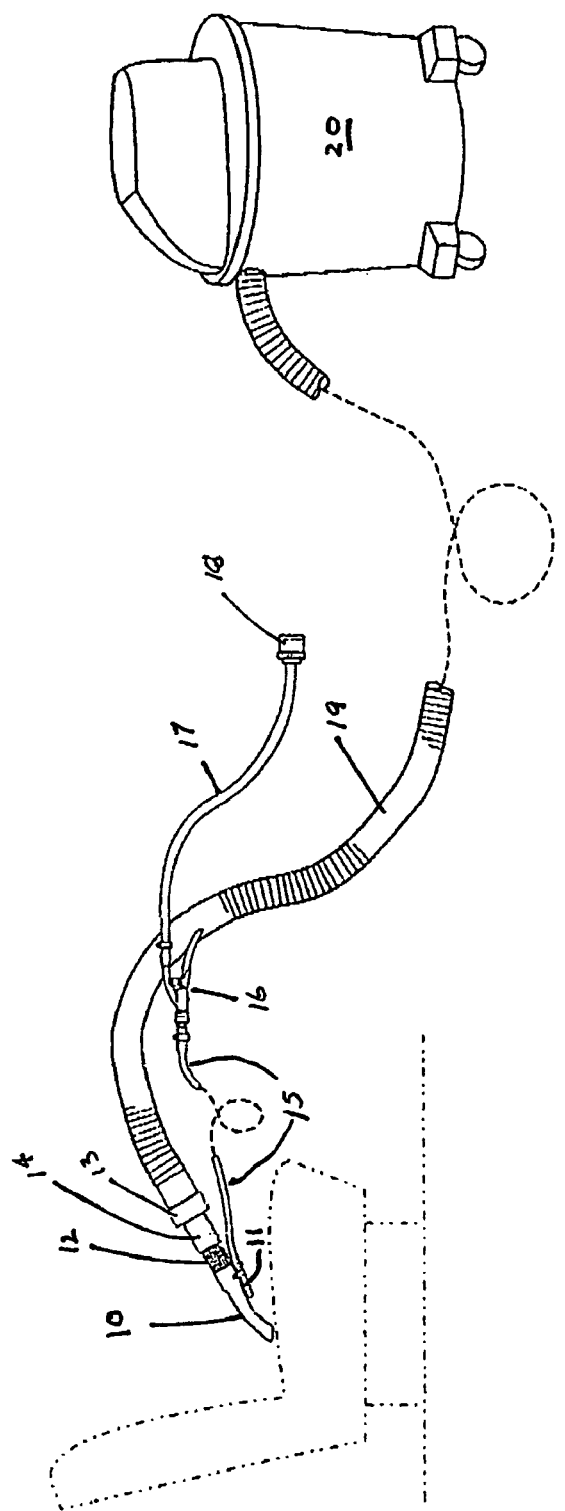
FIG. 1 is a schematic perspective illustration showing the invention set up for operation (external water line not attached or shown).
Figure 2:
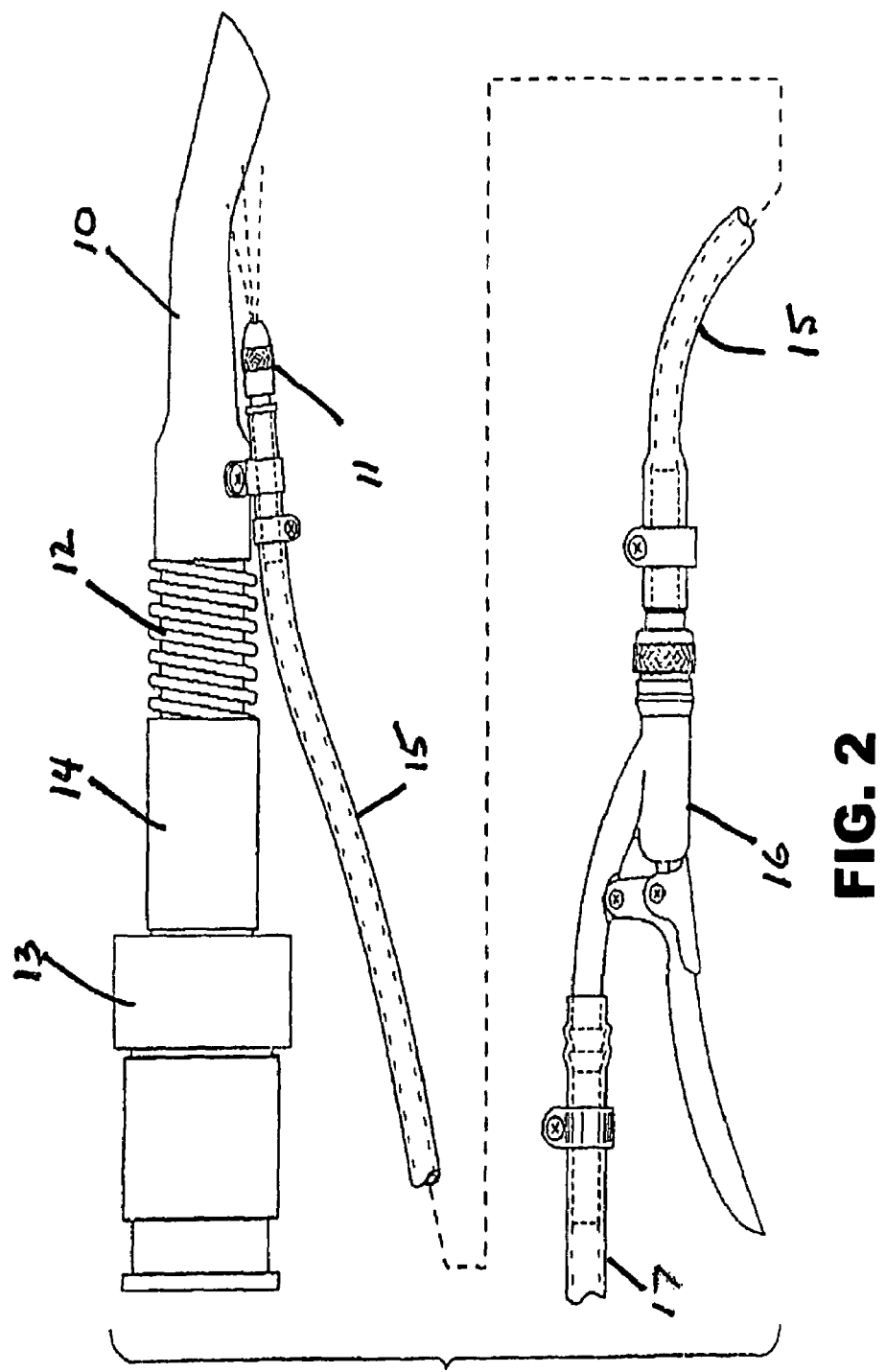
FIG. 2 is an enlarged schematic illustration of the inventive attachment.
Figure 3:
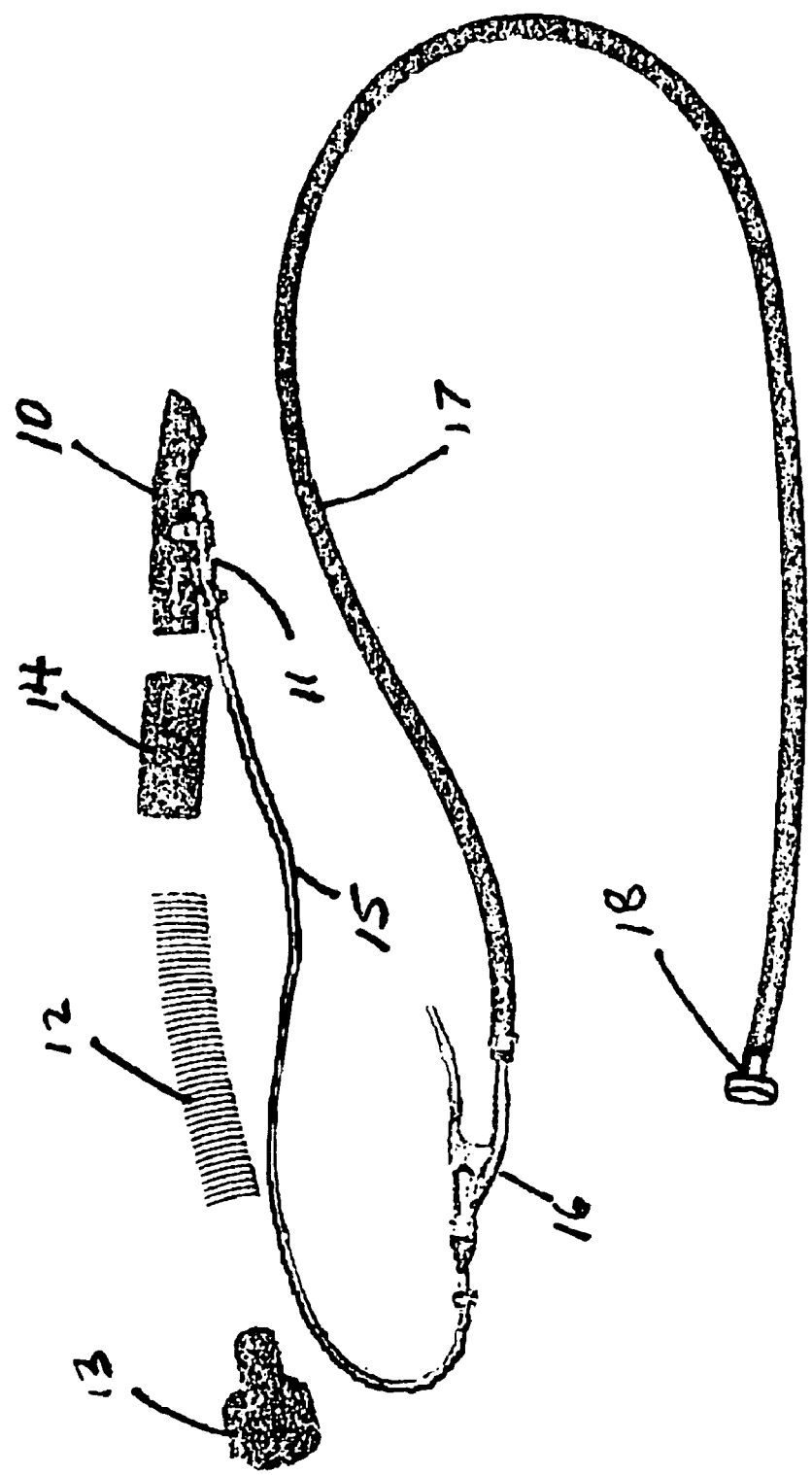
FIG. 3 is an exploded view of the terminal cleaning end of the device shown in FIG. 2.

The basic design of the cleaning attachment of the present invention will be best understood by reference to FIGS. 1 through 3. An angled vacuum nozzle 10 has affixed to it a liquid spray nozzle 11 in a manner such that liquid passing through the spray nozzle impinges on and is deflected by the lower, angled, terminal end of the vacuum nozzle in a manner that will be described in greater detail subsequently herein. The vacuum nozzle is connected by means of a flexible hose 12 to a reducer 13. Flexible hose 12 has a sliding collar 14; the sliding collar 14 is shorter in length than the flexible hose 12 such that the collar may be moved to various positions between vacuum nozzle 10 and reducer 13. Liquid nozzle 11 is connected by means of hose 15 to the outlet end of trigger valve or other hand-operated control valve 16. The inlet of valve 16, in turn, is connected to a length of hose 17 that is provided with a connector 18 of the type normally found on the terminal end of a garden hose. As is shown in FIG. 1, for operational purposes, the cleaning attachment of the present invention is attached to a vacuum hose 19 and to a standard wet vac, 20, by means of a reducer, 13. Hose 17 is connected by means of connecting coupler 18 to a water supply, not shown, which could be nothing more than a standard garden hose connected to a typical outdoor water faucet.

Figure 4:
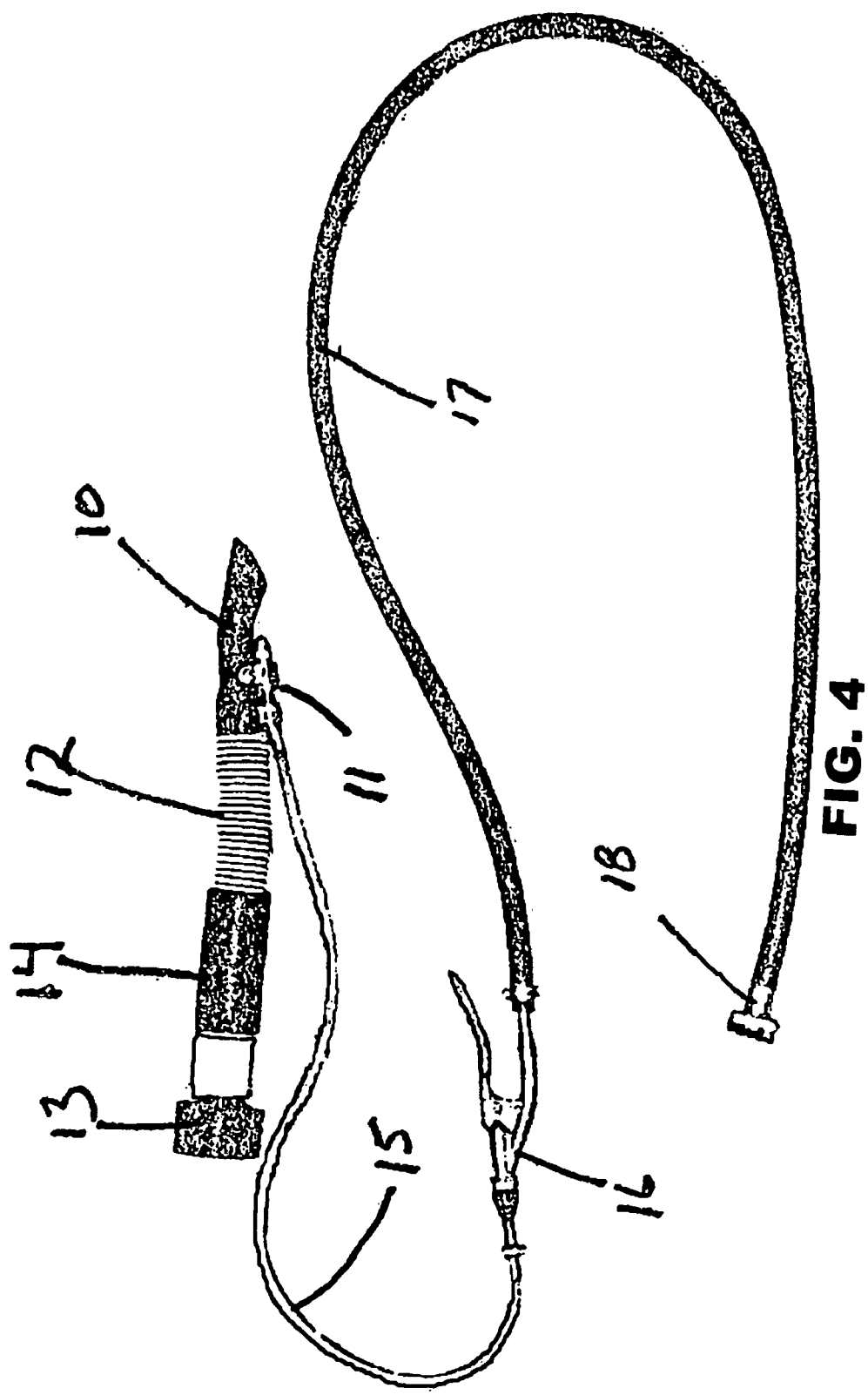
FIG. 4 is an assembled illustration of one version of the cleaning attachment of the present invention.

In a typical vehicular cleaning operation, the cleaning attachment as shown in FIG. 4 is connected by means of reducer 13 to a source of vacuum and, by means of coupler 18, to a source of water. By means of trigger valve 16, a fine mist of spray is deflected from the underside of vacuum nozzle 10 onto the vehicle carpet or upholstery to be treated. The open terminal end of vacuum nozzle 10 is rubbed or scraped across the sections to be cleaned to dislodge dirt or debris and draw it up into the wet vac. From time to time, additional water may be sprayed onto the upholstery or carpet of the vehicle, but ideally that should only be done when the vacuum nozzle outlet is being moved in a direction toward the area of impact of the water spray, rather than when it is moving away from it, so that any water sprayed will be picked up rapidly without soaking deeply into the upholstery or carpet. In this way, the attachment will extract all or most of the water and dirt from the soiled areas to permit a relatively short period of drying time thereafter. In a typical operation, the carpet or upholstery may be lightly sprayed with a water-soluble cleaning solution in advance of using the subject attachment, or during use, and the attachment, with its misting spray, will dilute and then remove the water soluble cleaning materials with the soil and excess water. After one is through using the attachment, the attachment can be removed from the water line and the vacuum line, drained of liquid, and coiled up and put away.

Figure 5A:
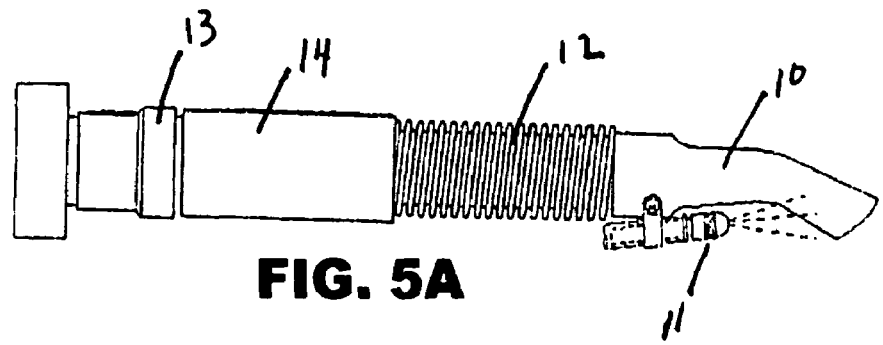
FIGS. 5A through D illustrate the present invention in positions of different adjustment.
Figure 5B:
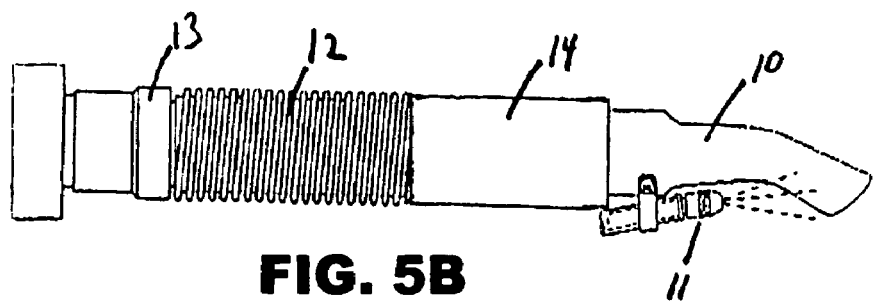
Figure 5C:
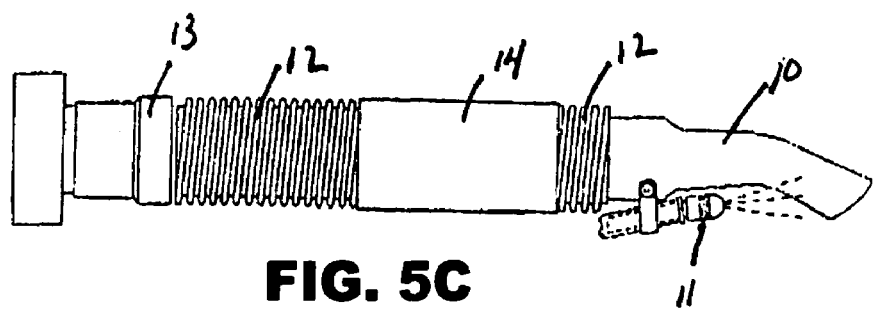
Figure 5D:
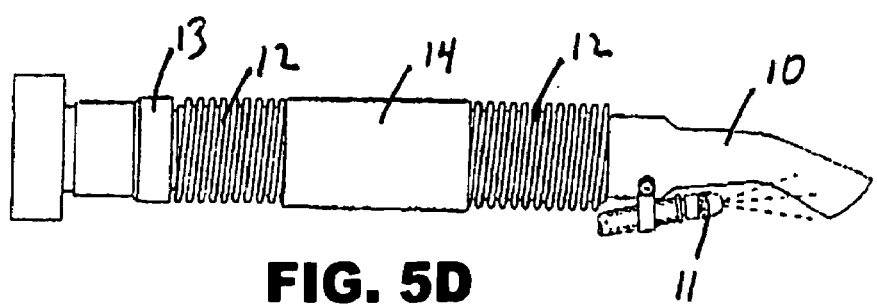

One of the particular points of novelty of the present invention which makes the invention highly adaptable for its intended purpose is illustrated in detail in FIGS. 5A through 5D. The sliding collar, or adjuster 14, permits the use of the attachment of the present invention in a number of difficult and "tight" positions. It must be remembered that the attachment of the present invention is intended to be used in the interior of vehicles in which available space for movement is quite restricted. The device must be adaptable to the cleaning of upholstery of vehicle seats, as well as the carpet on the floor, and must be able to even reach around and under the seats as necessary. The combination of flexible hose 12 and sliding collar or adjuster 14 provides the necessary versatility. With the sliding collar positioned all the way back from the spray head, the operator is provided with the maximum flexibility; the vacuum nozzle may be moved to a position 180 degrees from its normal position to permit holding of the vacuum nozzle head for cleaning of corners and angled areas (see FIG. 5A). With the sliding collar 14 pushed all the way forward against the spray head, the operator is provided with maximum cleaning pressure for pressing the head hard against flat areas. With the sliding collar 14 positioned only a small distance from the vacuum nozzle, the operator is provided with a small amount of flexibility at the vacuum nozzle head end while retaining much of the ability to retain a hard downward pressure (see FIG. 5C). By positioning the sliding collar 14 to approximately the center of the flexible tubing, as shown in FIG. 5D, the operator is provided with flexibility both in front of and in the rear of the sliding collar 14, enabling the hose 12 to snake in opposite directions at the same time, i.e. an "S" bend, allowing for cleaning in particularly difficult locations without losing control of the ability to press the vacuum nozzle downward for maximum contact of the vacuum nozzle head.

The following is a brief description of the method for using the present invention.

Begin the cleaning process by spraying carpet with an all purpose solution that is nondamaging to areas of carpet that are soiled or stained or, if necessary, to all areas of carpet. Connect water line to water outlet (warm water is necessary for best results). Connect vacuum hose to vacuum. Before turning vacuum machine on, depress water trigger using attachment to spray a fine mist of water on carpet where solution has been sprayed and allowed to soak in, and then agitate areas of carpet that are soiled, or all areas if necessary, with attachment head or small bristle brush. It is best to start cleaning higher areas under accelerator and brake peddle around humped areas and work downward. To do these areas, the adjuster handle should be set one-half (½) inch to one (1) inch back from the head, giving the necessary flexibility to clean those areas. When cleaning with the attachment, move in a forward and backward motion for a distance of three (3) inches to ten (10) inches, depending on the area, slowly, moving sideways or horizontally. Some areas may require overlapping once or twice. The water should only be used when moving attachment in backward motion to make certain that the vacuum will pick up the liquid almost immediately, rather than soak the carpet unless soaking is necessary. When finished with higher areas, continue the same process when cleaning flatter, lower areas. Adjuster should be set all the way forward to eliminate flex (unless flex is needed). The next areas to clean are nonvisible areas such as under and around seats. The adjuster can be moved in various positions at different angles. For example, when adjusted all the way back, a flex angle of 180 degrees back toward the tight areas around the seats is possible. At this adjustment, the head of the attachment must be held for control. After all areas of carpet are cleaned, use dry, clean towel to pat and wipe excess moisture out of carpets. Allow carpets to dry as long as needed.

Figure 6A:
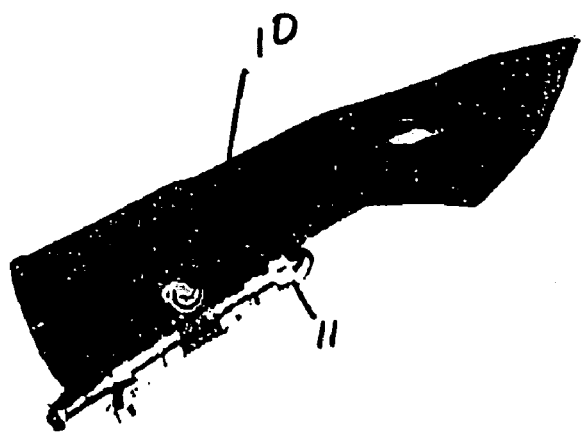
FIGS. 6A and B show two different views of the nozzle of the inventive attachment.
Figure 6B:
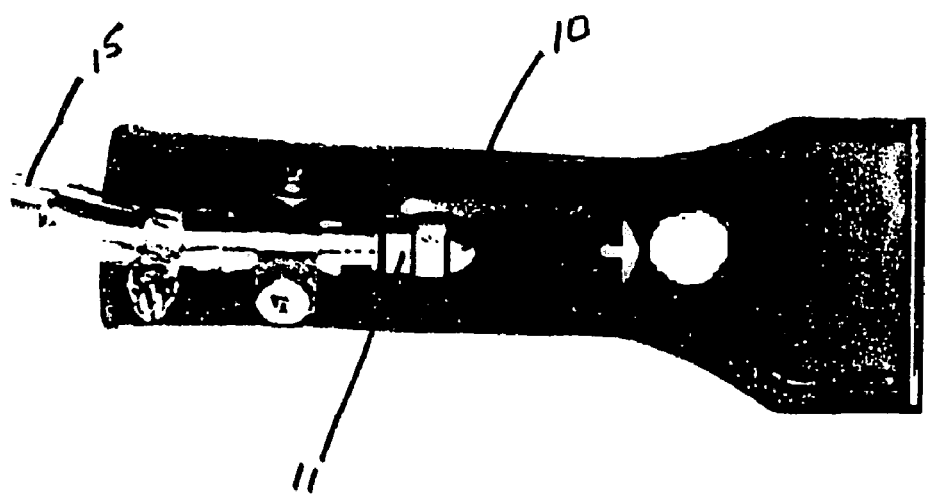

FIGS. 6A and 6B show, respectively, side view and an underside view of the vacuum nozzle cleaning head 10. The walls forming the opening to the vacuum nozzle 10 generally define a rectangular opening that is in the range of about 1 inch to about 1.5 inches wide and 1.5 inches to 2 inches across, i.e. in breadth. The liquid nozzle attached underneath may be permanently affixed to the vacuum nozzle or may be detachably attached thereto. The underside of the vacuum nozzle may be provided with a series of small holes which will pick up any drippage from the water nozzle after the water spray has been turned off, but while the vacuum nozzle is being used to vacuum the upholstery or carpet, and thereby further minimize the amount of soaking of the upholstery or carpet. The vacuum nozzle head ideally should be no more than ten (10) inches in length, and may be as short as four (4) inches; five (5) to eight (8) inches have been found to be optimum.

Water nozzle 11 should fit snugly against main body of the vacuum nozzle 10, but with the nozzle outlet positioned to direct the spray against the bent vacuum nozzle inlet. In general, the angle of bend for the inlet end of the vacuum nozzle should be in the range of about 15 to 40 degrees from the normal line of the vacuum nozzle and preferably is in the range of about 20 to 30 degrees.

Flexible hose 12 should be a minimum of eight (8) inches in length. The sliding collar 14 should not be greater than half the length of flexible hose 12. In general, the sliding collar should be in the range of three (3) inches to six (6)

inches, and preferably in the range of four (4) to five (5) inches. In this case, the minimum length of the flexible hose should be in the range of eight (8) to twelve (12) inches. For vans or other larger vehicles or in vehicles having longer carpets or more extensive areas to be cleaned, the sliding collar can be any suitable greater length provided that the flexible hose is at least twice that length. These dimensional relationships are important if the advantages of maximum versatility and flexibility, i.e. if the ability to go 180 degrees in bend or to form an S-bend is to be attained. Further, as long as the sliding collar is positioned within three (3) inches of the vacuum nozzle head, minimum flex in the immediate vicinity of the vacuum nozzle head results, and maximum vacuum nozzle head control is obtained.

There are a number of advantages to the present invention, among which is its versatility. The attachment can be used to vacuum heavy (dry) debris out of the vehicle without using water, and the process can be begun without having to change attachments when switching over to water spraying. Since the equipment and the process are designed to minimize the amount of cleaning solution required, the attachment can be used to loosen the debris and vacuum at the same time, without having to use anything other than added water. If cleaning solution is desired, it can be done as described with a light spray before beginning the wet vacuuming operation, or can be used only when needed for spot cleaning. By having control valve on the water line on an extended hose 15, the user can operate the valve a distance removed from vacuum nozzle head water nozzle, thereby providing the cleaning implement with a smaller profile which is, therefore, easier to access small or tight areas. In that regard, hose 15 is optimally about three (3) feet long. The device of the present invention is so adaptable that it can be used to clean vehicle ashtrays and cup holders, as well as carpets and upholstery, without the need to change nozzle heads. One big advantage of the present invention is found in the cleaning of the upholstery of vehicle seats. This attachment permits the volume of water or spray that is needed to be substantially reduced from what is normally required, and the operator can concentrate on spot cleaning where needed, coupled with vacuuming dirt and stains from upholstery or carpet.

The present cleaning system is specifically designed for tough cleaning tasks. Originally it was developed for the automobile industry and for the automotive detail professional in particular. These professionals have, for a long time, sought out solutions to soiled carpets, upholstery, and other interior areas. The present cleaning system provides a means for highly effective interior cleaning. In the past, the automotive detailing industry faced a daunting problem: how do you clean the carpets and upholstery of a used automobile. The standard way of cleaning interiors was to use a bucket and water, soaking the entire interior, and using a vacuum cleaner to pick up the debris. This resulted in excessive moisture being introduced into the interior of the vehicle. The result was mold and mildew, and their odors. There actually was no effective way of removing the water other than an extracting machine, and seats, panels, and carpets remained wet for days on end. For big jobs, extractor machines could be practical; these are large steam cleaning units which used water and or steam to clean the carpets and upholstery. The problem with these extractors, besides an enormous cost, was that the process of cleaning a carpet in an automobile, takes three (3) to four (4) steps, even requiring the removal of the seats in some cases. All of the debris had to be removed, which meant that the user had to vacuum the car at least twice at a minimum. Some tougher jobs had to be gone over again and again. Seats need to be removed in some cases because of the size of the extractor cleaning heads, which tends to be clumsy, with integrated trigger systems to control the water flow.

The present cleaning system combines the power of the vacuum cleaner and the power of cleansing water in a one-step cleaning process where debris up to the size of a U.S. quarter is handled, deep water-based cleaning is provided, and no additional work needs to be performed, such as removal of seats, etc. This is because of the unique design of the present cleaning system. Further, the present cleaning system is not limited to auto interiors. Applications include: automobiles, boats, rugs, floor mats, kitchen spills, etc. Combined with a standard shop vac, and a standard water supply line, there are not too many cleaning problems that the present cleaning system cannot handle.

The present cleaning system is attached to a standard household, or industrial wet vacuum system which, when combined with a customized water regulation system, allows freedom of movement of the cleaning head in any direction. The attachment provides a flexible head, which is small enough to clean most automotive interiors, and with the upcoming Dirt eRacer™ crevice tool, the total answer to the tough auto interior is utterly solved.

The system requires a standard wet vacuum; a unit of three (3) to six (6) horsepower is usually sufficient for the professional auto detailer. However smaller jobs and home use could accommodate a lesser-powered wet vacuum. A standard garden hose can be used for the water supply, and a shut off valve at the end of the hose is recommended.

To clean an interior of an automobile, the user would simply attach the present cleaning system attachment to the wet vacuum, and attach the water regulation hose to the garden hose. Note: at this point in the process, you would introduce a non-damaging carpet and/or fabric cleaning solvent to the cleaning area (see below). The automobile is then vacuumed in the usual manner. The flexible, multi-directional head is held in one hand, and the convenient water flow regulator is held in the other. The soiled area is vacuumed, and the water regulator is used to generate a flow of mist at the multi-directional head. Water introduced to the affected material is vacuumed away essentially instantly; thereby eliminating saturation of seats, carpets, etc. Once the area is cleaned to satisfaction, the water supply is turned off, and the vacuum nozzle is used without water to remove all but the minimal amount of water. A quick towel dry provides a mess-free answer to previously impossible cleaning conditions.

Cleaning solvents and/or solutions can be used for carpets and more severely soiled areas, and the present cleaning system is there to provide optimal effectiveness of the cleaning products, along with an unparalleled process of removing the cleaning solvents and/or solutions from the material fabric or carpets, et cetera. In the past, use of cleaning solutions was frowned upon in many detail shops because of the following fact. Once a solvent is applied to a fabric or carpet, there will always be some residual solvent in the fabric or carpet unless that material is thoroughly rinsed. The consequences of residual solvents left in fabric and carpets can be devastating. Solvents will continue to break down the fabric or carpet, and solvents can pass through to the clothing of the occupants, etc. In a flash, the present cleaning system removes solvents, and the present cleaning system's cleaning head provides an adjustable spray that not only can be regulated, but can be used in a manner that determines how wide or narrow a stream of water is injected into the cleaning process. Water is whisked away and, with a quick towel dry, the vehicle is ready to use, with no solvent residue or mess. There is nothing more disappointing than a freshly detailed auto in which the carpets have yellowed or a moisture-induced odor exists in the vehicle following cleaning, or a cleaned car with seats which are still soiled by years of use. Proper use of the present invention will avoid such disappointments.

Cleaning Methods

Setup:
1. Ensure that there is adequate ventilation in the room, and that there are no obstacles, which might prevent freedom of movement while using the present cleaning system.
2. Keep children clear of work area and away from the present cleaning system.
3. Inspect and be sure that the wet vacuum is operating satisfactorily.
   a. Empty the wet vacuum and clean out the container, to maximize suction.
   b. Inspect the power cables for worn parts, and do not use if there are cracks in the cables, etc.
   c. Be sure that the power source is adequate for the wet vacuum, per the specifications for the wet vacuum.
   d. Inspect the hoses and the connections on the wet vacuum for cracks and or jagged edges, which could reduce performance or cause damage to the interior of the vehicle, or the property.
   e. Remove all obstructions from the vacuum hose, if they are present.
4. Inspect and be sure that the water supply is operating satisfactorily.
   a. Determine how to shut off the water main in case of an emergency.
   b. Inspect the hose and attaching ends for wear and leaks.
   c. Inspect and operate hose shut-off valve (recommended) so that water can be turned off locally to the work area.
   d. If using hot water, adjust water temperature appropriately to prevent accidental scalding.
5. Install one of the present cleaning system attachments to the wet vacuum suction hose using our provided adapter.
   a. Inspect the present cleaning system attachment to insure that there are no broken or missing parts.
   b. Operate the vacuum and ensure that there is adequate suction, per the specifications for the wet vacuum. If there is not adequate suction, do not use the present cleaning system; damage to carpets, fabric, and property may result if the product is used without adequate suction.
6. Attach the water supply line to the water flow regulator hose using the standard garden hose attachment.
   a. Inspect the water flow regulator for wear, broken parts, or jagged edges. If there are issues with the water regulator or the hoses attaching it to the water supply line, do no not use the product until the conditions have been remedied.
   b. Turn on the water supply and operate the water flow regulator. Become familiar with the lock setting, and the amount of water that is disbursed.
   c. If using hot or warm water, operate the water flow regulator until the desired water temperature has been achieved; personal injury can result if water temperatures are too high.
   d. Note: If a period of three (3) to five (5) minutes elapses between water sprays, repeat step 6c.
7. Prepare work area for optimal operation.
   a. Ensure that the hose length is adequate to reach the desired cleaning area.
   b. Ensure that there are no obstacles inhibiting range of motion, such as objects resting on hose lines or vacuum lines.
   c. Ensure that both hands are available to operate flexible head and water regulator.

You are now ready to clean a surface using the present cleaning system. Different techniques are employed to get optimal results using the product. Below are methods to optimize for different levels of dirt.

Solvent-Based Cleaning:
1. Obtain and test a non-intrusive cleaning solvent. Test a small area of material to be cleaned to ensure that no damage to the material occurs when introduced to the solvent.
2. Apply solvent to desired cleaning area.
   a. Cleaning in smaller sections provides better results and a more uniform cleaning pattern.
   b. Attempt to apply solvent in a uniform manner so that cleaning results are similar.
   c. Some more soiled areas may require more solvent than others. Over time, familiarity with solvent quantities will be achieved.
3. Apply a pre-coating of water to activate solvent.
   a. Depress the trigger on the water regulator and allow spray mist to gently wet the cleaning area.
   b. Do not over soak the material, but apply an even amount of water to activate the solvent.
   c. For best results: hold flex-head three (3) to six (6) inches over the desired cleaning area.
4. Agitate cleaning area to mix water and solvent and provide optimal cleaning.
   a. Use a small brush, or the end of the flex-head, to provide agitation.
   b. More soiled areas may require re-application of solvent and water.
5. Vacuum prepared area using flex-head.
   a. The adjustable slider handle is provided for several kinds of cleaning orientations. For example, the slider in up position is useful for long cleaning passes; use this on open areas or areas that require a longer reach. The slider in the back position frees up the flex head to move in any position up to 180 degrees; use this position for tighter areas such as under seats, or uneven surfaces.
   b. Use long, even strokes for best results. Change the angle of the head periodically for forward and backward strokes.
   c. Overlap each pass slightly to provide total cleaning coverage.
   d. Regulate the water applied and try to keep the water usage consistent throughout the cleaning process.
   e. For more soiled areas, use the trigger lock mechanism to allow constant water flow while moving the flex-head in alternating forward and backward motions. For lesser-soiled areas: use water flow in one direction only; for example, depress trigger only on backward cleaning passes.
   f. Rinse-vacuum the area thoroughly.

g. Use water and agitate the material to check for suds from solvents.

h. Re-apply water and vacuum repeatedly to ensure that no suds are visible. When suds are not visible, selected area is free of residual solvents.

i. Continue this process for each cleaning area.

j. Vacuum area thoroughly with no water application to remove and (*** any) additional moisture.

6. Towel dry clean surface. Use a dry, clean towel to pick up any residual moisture. Use towel to dry up any additional moisture, fluff up carpets, et cetera.

7. Allow time for cleaned material to dry.
   a. Dry time may vary, depending upon cleaning performed.
   b. Most surfaces should be dry in twenty-four (24) hours, given adequate ventilation Non-Solvent Based Cleaning:

For non-solvent based cleaning, such as more delicate materials, use steps 3, 5, 6, 7 and 8 from above. In addition, water usage and agitation may be increased to provide a reasonable cleaning result. Note: most fabric and carpet cleaning applications exhibit much better cleaning results when a non-damaging solvent is used. However, for spills, quick cleanups, and freshening up of non-heavily soiled areas, cleaning without solution may, in fact, be appropriate.

Cleanup and Storage:

1. When usage is completed, switch off wet vacuum. Be careful not to be standing in any quantity of water when operating the switch on the wet vacuum.

2. Turn off and disconnect water supply line from the water source.

3. Carefully disconnect the water regulator line from the water hose. Keep a towel within reach in case of spraying water. If using hot water, the connectors on the hose could be hot.

4. Carefully disconnect the present cleaning system adapter from the vacuum line of the wet vacuum.

5. Raise the present cleaning system adapter up and hold in a vertical position. Remove any debris that may have become lodged in the vacuum hose.

6. Remove water from water regulator line.
   a. With the flex head in vertical position, depress the water regulator trigger.
   b. Starting at the regulator, raise up the hose so that the hose is higher than the flex head.
   c. Continue to raise the hose while sliding hand along water line.
   d. Continue this process until all the water is removed from the line.

7. Wind water line carefully and store present cleaning system adapter.

Tips and Tricks:

1. Flex-head slider operation
   a. Slider all the way back; provides maximum flexibility for the flex-head with up to 180 degrees of turning and 360 degrees of head spin for cleaning anywhere.
   b. Slider in the extreme forward position, over the flex-head provides maximum reach, and stability for open areas.
   c. Slider one and one-half (1½) to two (2) inches from flex-head; provides additional reach, without losing control of flex-head.
   d. Slider at center of flex tube allows for opposite (S-turns) action when bending the flex tube for longer reach and different angles.

2. If flex-head becomes stuck, or is not moving smoothly over surface.
   a. Lift or lower the angle of attack. (i.e. the angle the attachment is held during use).
   b. Turn the attachment from side to side to clear any binding in the surface.

3. Adjust the water spray stream at the flex-head.
   a. An adjustment is provided to spray a wide mist or a narrow stream of water into the flex-head nozzle.
   b. Soaking of an area may need a narrower stream, while general cleaning uses a wider dispersion.

4. Avoid cleaning any appliance while appliance is plugged into a power source.
   a. Water introduced into a working electrical device can be dangerous.

5. Repeated agitation of soiled areas
   a. Re-application of solvents and/or continued agitation may damage certain fabrics, et cetera.
   b. Some stains simply will not come out. When a material is discolored, continued cleaning may only damage material.

PREFERRED EMBODIMENTS

As described above, the present cleaning system utilizes a sliding collar to provide rigidity in the vicinity of the cleaning head when needed, but permit flexing of the vacuum hose to permit the flex head to go into unusual locations at unusual angles. Under these circumstances, it was recommended that the collar be in the range of three (3) to six (6) inches, with the minimum vacuum hose length being twice that of the sliding collar. It was also described that when a larger vehicle is being cleaned, a longer sliding collar may be utilized, provided, once again, that the flexible vacuum hose is at least twice the length of the extended sliding collar.

In a preferred embodiment, the system is provided with at least two (2) sliding collars, with the first sliding collar immediately adjacent to the cleaning head, falling within the range of three (3) to six (6) inches, and with the next adjacent sliding collar being of any suitable length equal to or greater than the first sliding collar, provided that the minimum length of flexible hose is at least twice the combined length of the sliding collars. At the point where the first and second sliding collars are in abutment to each other, one of them is flared slightly so as to overlap a small portion of the abutting end of the other sliding collar with a frictional fit holding the two sliding collars together during normal usage, but permitting the user to separate them so as to use the one adjacent to the vacuum flex head in essentially the manner described above, while permitting the two to be joined together frictionally when it is desired to use two of the sliding collars as a single length when working on longer vehicles, such as vans, et cetera. When the collars are frictionally joined, at that point they act as a single, longer, sliding collar, as described above for using a single longer collar, but without the limitation of having to switch back and forth between two different sized collars.

A second preferred embodiment relates to the water line. There is currently available "coiled" water hose which is coiled much in the manner of a coiled telephone line such that it can, when desired, be stretched to the extent of the spring coils, but which will relax back into a shorter length when the longitudinal pull on the coiled cord or hose is relaxed. Such coiled water hose is of particular value in the present invention in that it keeps the water hose from bunching up and getting in the way at times when its extension is not necessary, and yet permits the hose to be stretched to the fully operable length when such is needed to reach more distant parts of a vehicle being cleaned.

Figure 7A:
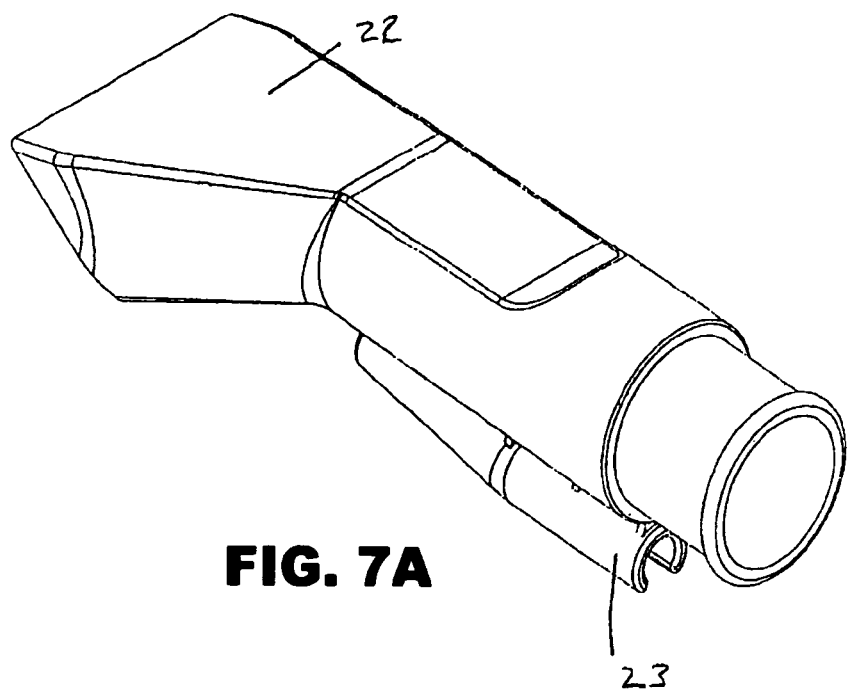
FIGS. 7A and B show two different views of the nozzle of the preferred embodiment of the inventive attachment.
Figure 7B:
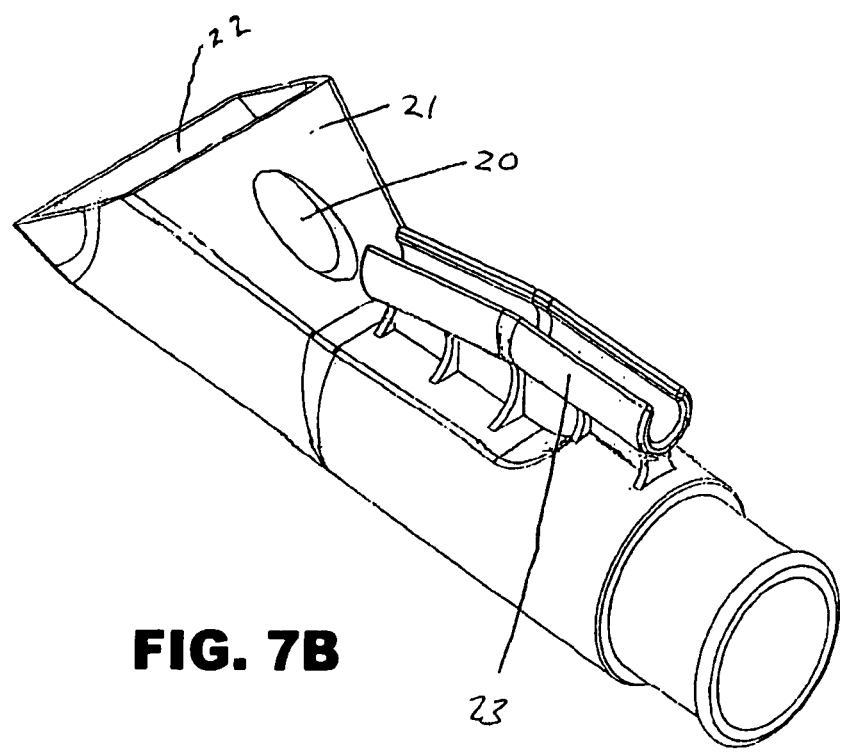

Still another preferred embodiment is illustrated in FIGS. 7A and 7B. In this embodiment, instead of the liquid spray nozzle (see FIG. 2) being positioned such that liquid passing through the spray nozzle impinges and is deflected by the lower terminal end of the vacuum nozzle, it passes through an opening 20 in the lower surface of the nozzle 21 such that the water spray from the nozzle impinges on the inner side 22 of the upper side of the vacuum nozzle 23. This nozzle is also provided with a friction fitting 23 as a nozzle supporting fitting into which the nozzle can snap and be held frictionally with the nozzle being located in and/or pointing into opening 20. When the water nozzle causes water to impinge on the lower side of the nozzle, as shown in FIG. 2, it was considered preferred to have some small holes in that vicinity which would also draw vacuum and catch any drips from the nozzle. With the embodiment shown in FIG. 7, such additional holes are unnecessary. The end of the nozzle is already positioned adjacent to the direction of flow from the vacuum nozzle such that any "drips" would occur inside the nozzle, and be carried along by the vacuum stream.

Figure 8:
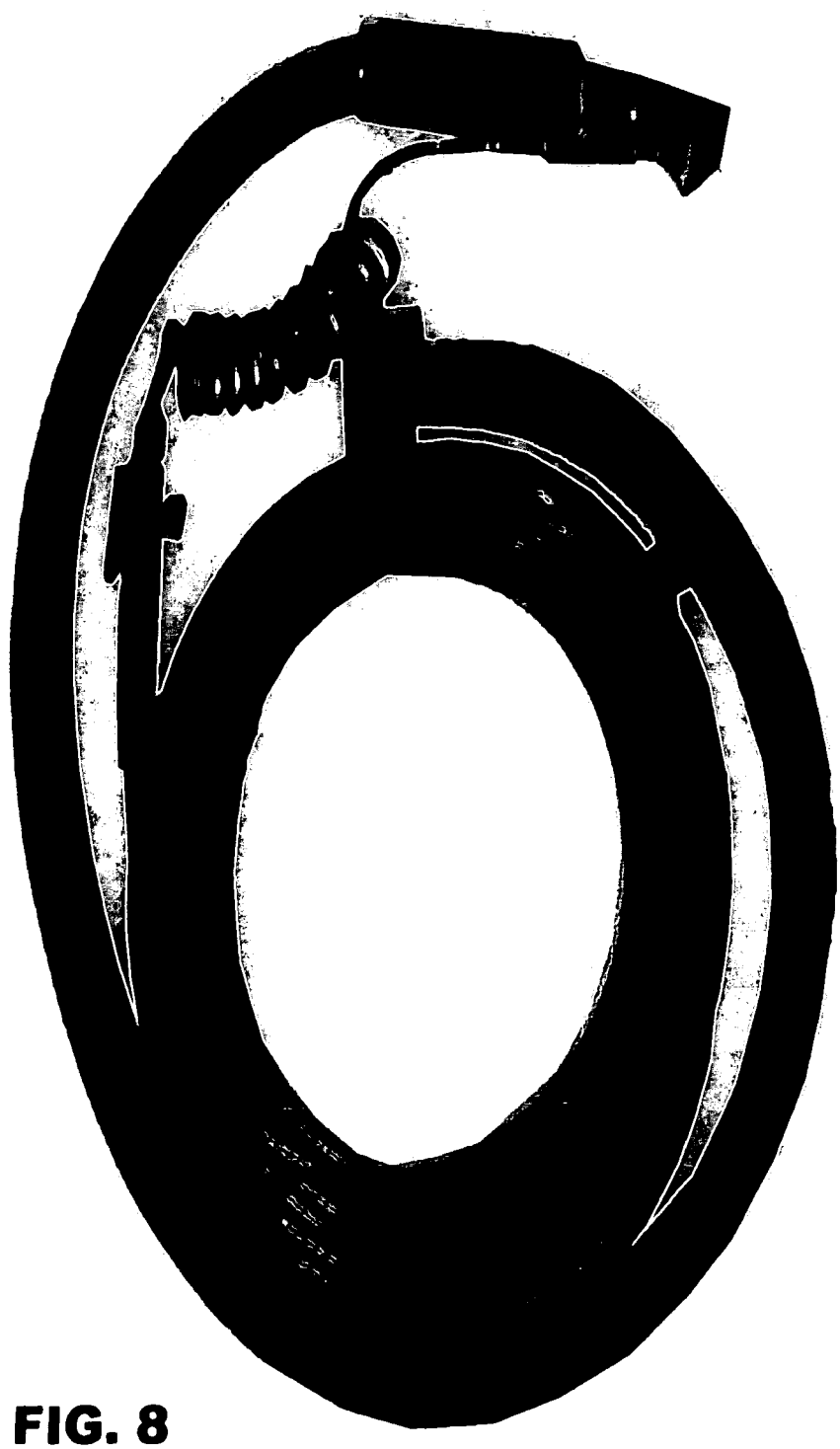
FIG. 8 shows the overall view of the preferred embodiment of the present invention.

The preferred embodiment of this invention is illustrated in FIG. 8.

Other variations and embodiments of the invention are within the routine skill of the art, and it is intended that this disclosure and claims contemplate such routine variations.

What is claimed is:

1. A vehicle cleaning apparatus adapted to be connected to a wet vac and a to a garden hose water supply comprising in combination (a) a rigid cleaning head attached to one end of a flexible hose, the other end of said flexible hose provided with an attachment for attaching to a wet vac, said flexible hose further provided with a sliding collar between the two ends of said flexible hose, to vary the flexibility of said flexible hose and (b) a water supply device comprising (1) a nozzle in which water passing through such nozzle impinges on and is dispersed by a surface of said cleaning head, (2) a flexible hose connected at one end to said nozzle for conducting water to said nozzle, (3) a hand-controlled valve mechanism attached to said water supply flexible hose controlling the flow of water into said hose and through said nozzle, and (4) an attachment means connected to said hand-controlled valve mechanism adapted to connect said water supply device to a garden hose water supply.

* * * * *